United States Patent [19]

Kusakabe et al.

[11] 4,166,052

[45] Aug. 28, 1979

[54] PNEUMATIC TIRE COMPRISING POLYISOPRENE RUBBER AND ALKALI METAL ALGINATE IN AT LEAST TREAD PORTION THEREOF ADAPTED FOR TRAVELLING ON FROZEN ROADS

[75] Inventors: Noboru Kusakabe, Ohme; Nobumasa Ikeda, Kodaira, both of Japan

[73] Assignee: Bridgestone Tire Company Limited, Kyobashi, Japan

[21] Appl. No.: 806,126

[22] Filed: Jun. 13, 1977

[30] Foreign Application Priority Data

Jun. 12, 1976 [JP] Japan .................................. 51-68219

[51] Int. Cl.$^2$ .............................................. C08L 5/04
[52] U.S. Cl. ......................... 260/17.4 ST; 152/209 R; 152/330 R; 152/354 R; 260/17.5; 260/42.47
[58] Field of Search ...................... 260/17.4 ST, 17.5; 152/330 R

[56] References Cited

U.S. PATENT DOCUMENTS

| | | | |
|---|---|---|---|
| 3,638,702 | 2/1972 | Endter .................................. | 152/330 |
| 3,815,651 | 6/1974 | Neal ..................................... | 152/187 |
| 3,938,574 | 2/1976 | Burmester et al. .............. | 152/330 R |
| 3,964,949 | 6/1976 | Kent et al. ............................. | 156/96 |
| 4,017,654 | 4/1977 | Evans ............................... | 152/330 R |

OTHER PUBLICATIONS

Chem. Absts. 67:100862j, Tire Cord Coatings, Gardner.
Chem. Absts. 70:58790u, Rubber Composition for Tire Carcasses, Klamann.

*Primary Examiner*—Edward M. Woodberry
*Attorney, Agent, or Firm*—Sughrue, Rothwell, Mion, Zinn and Macpeak

[57] ABSTRACT

A rubber composition containing polyisoprene rubber or a blend of polyisoprene rubber and polybutadiene rubber has a high friction coefficient against the frozen road surface due to the easy deformability at low temperature and high affinity for water. A pneumatic tire comprising a tread consisting of the rubber composition is excellent in the brake, traction and cornering performances and can travel safely on frozen roads without the use of spikes or a chain.

9 Claims, No Drawings

PNEUMATIC TIRE COMPRISING POLYISOPRENE RUBBER AND ALKALI METAL ALGINATE IN AT LEAST TREAD PORTION THEREOF ADAPTED FOR TRAVELLING ON FROZEN ROADS

BACKGROUND OF THE INVENTION (1) Field of the Invention

The present invention relates to a pneumatic tire having an improved tread, and more particularly to a pneumatic tire for travelling on frozen roads, which has a tread consisting of an improved rubber composition having a high friction coefficient against frozen road surface.

(2) Description of the Prior Art

There has hitherto been proposed a so-called spiked tire having a tread provided with spikes, or a tire united with a chain in order to travel safely on a frozen road. However, when these tires with spikes or a chain travel on a paved road not covered with snow or ice, the road surface is damaged or heavy noise is produced to cause serious public problems due to the contact of the metals, such as spikes and chain, with the road surface. In order to solve these problems, the development of pneumatic tires for travelling on frozen roads, which do not require spikes or a chain, has been demanded.

In order to satisfy the demand, the inventors have made various investigations and found out that, when the frictional force between the tread rubber of a tire and the road surface is high, the tire can travel safely on frozen roads without the use of spikes or a chain, and that the use of a rubber composition having an improved property in the tread is effective for this purpose.

It is generally considered that friction between the tread rubber of a tire and the common paved road surface not covered with ice and snow is caused by the energy loss of the rubber and the sticking force of the rubber with the road surface, and that a rubber having the higher energy loss and sticking force has the higher friction coefficient. However, it is also considered that, when a paved road surface is wet, sticking force does not substantially act between a rubber and the road surface due to the presence of water film, and the friction coefficient of the rubber against the wet paved road surface depends mainly upon the energy loss of the rubber. Therefore, it is necessary that the energy loss of rubber must be large in order to increase the friction coefficient of the rubber. However, deformation of rubber generally becomes difficult at low temperature produced, for example, on the frozen road due to remarkably poor movability of rubber molecule at such low temperature. Therefore, the contribution of the energy loss of rubber to the increase of the friction coefficient of the rubber is very small. Accordingly, when a rubber easily deformable even at low temperature is used to increase its contact area with ground and to improve its sticking force to ice in the presence of water film, the friction coefficient of the rubber against frozen road surface can be increased. The inventors have found out that, when a low temperature-resistant rubber composition containing at least polyisoprene rubber as a rubber component and having a low JIS hardness at low temperature, a low tan δ peak temperature and an improved affinity for water is used in the tread of a tire, the friction coefficient of the tire against frozen road surface is high and the tire can travel safely on frozen roads, and accomplished the present invention.

SUMMARY OF THE INVENTION

The object of the present invention is to provide a pneumatic tire which can travel safely on frozen roads without the use of spikes or a chain.

The feature of the present invention is the provision of a pneumatic tire for travelling on frozen roads, comprising at least the ground contact portion, including to the depth end of the grooves, composed of a rubber composition consisting of a rubber component, an affinity-improver, carbon black and commonly used softener, vulcanizer and other compounding agents, the amount of said affinity-improver being 0-20 parts by weight based on 100 parts by weight of the rubber component, and said rubber composition having JIS hardnesses of 50-80 degrees at $-30°$ C. and 50-65 degrees at 25° C., a tan δ peak temperature of not higher than $-40°$ C. and an affinity for water of not lower than 6.5 $cm^2/cc$.

DETAILED DESCRIPTION OF THE INVENTION

In the present invention, the JIS hardness of a rubber composition means a hardness measured by a JIS hardness tester. Commonly used tread rubber composition has a JIS hardness of higher than 80 degrees at $-30°$ C. However, it is necessary that easily deformable rubber composition must have a JIS hardness which is as low as possible within the range of not higher than 80 degrees. Accordingly, it is necessary that a rubber composition having a JIS hardness of 50-80 degrees must be used in the present invention.

The tan δ peak temperature of a rubber composition means such a temperature, at which tan δ in the viscoelasticity curve of the rubber composition shows the maximum value when the rubber composition is heated from about $-80°$ C. to $+100°$ C. by means of a vibration type dynamic visco-elastometer. Commonly used tread rubber composition for passenger car has a tan δ peak temperature ranging about from $-39°$ C. to $-20°$ C. Rubber composition having such tan δ peak temperature is poor in the movability of the rubber molecule at low temperature, and is low in the friction coefficient. Therefore, it is necessary that the rubber composition to be used as a tread rubber in the present invention must have a tan δ peak temperature lower than the lower limit temperature of the above described range, that is, a tan δ peak temperature of not higher than $-40°$ C.

In the present invention, the affinity of a rubber composition for water is represented by the wet area ($cm^2/cc$) of the rubber composition when 1 cc of water is dropped on the rubber composition surface. In the present invention, it is necessary to use a tread rubber composition having an affinity for water of not lower than 6.5 $cm^2/cc$.

In order to satisfy the above described requirements, it is necessary that the low temperature-resistant rubber composition used in at least the ground contact portion, including to the depth end of the grooves, of the pneumatic tire according to the present invention must contain polyisoprene rubber or a blend of polyisoprene rubber and polybutadiene rubber as a rubber component. Polyisoprene rubber is high in the energy loss in the presence of water film, that is, in the wet state. Therefore, polyisoprene rubber has a high friction coefficient against wet paved road surface. When an affinity-improver explained later is added to polyisoprene, the friction coefficient of polyisoprene is improved. Polybutadiene has a high friction coefficient against paved road surface covered with ice or snow. When a blend of polyisoprene rubber and polybutadiene rubber is used, the mixing ratio of polybutadiene rubber with polyisoprene rubber should be determined depending upon the use purpose. In general, polybutadiene rubber is used in an amount of up to 90 parts by weight, preferably up to 50 parts by weight, based on 100 parts by weight of the total amount of the rubber blend. Further, an affinity-improver may be added to the low temperature-resistant rubber composition to be used in the present invention in order to improve the affinity for water in an amount of 0–20 parts by weight, preferably 3–20 parts by weight, based on 100 parts by weight of the rubber component. The affinity-improver includes alginates, such as sodium alginate and the like, ligninsulfonic acid, polyvinyl alcohol and the like.

The pneumatic tire comprising a tread, which uses a rubber composition having the above described improved properties at low temperature in at least the ground contact surface of the cap of the tread inclusive of a position up to the depth of the grooves of tread pattern in the cap, has a high friction coefficient against frozen road surface even when the tire travels on frozen roads, and develops a sufficiently high ability to be used as a pneumatic tire for travelling on frozen roads without the use of spikes or a chain. Therefore, the damage of paved road surface and the noise due to spikes and chain can be prevented, and the tire is very valuable in industry.

The following examples are given for the purpose of illustration of this invention and are not intended as limitations thereof.

EXAMPLES

Polyisoprene rubber or a blend of polyisoprene rubber and polybutadiene rubber in a mixing ratio (parts by weight) shown in the following Table 1 was compounded with commonly used compounding agents to produce rubber compositions (Examples 1 and 2). Further, the above described rubber blend was compounded with commonly used compounding agents and sodium alginate to produce a rubber composition (Example 3). For comparison, polyisoprene rubber, polystyrenebutadiene rubber, polybutadiene rubber and commonly used compounding agents were mixed in the compounding recipe shown in Table 1 to produce rubber compositions of Comparative Examples 1–4.

The JIS hardness, tan δ peak temperature and affinity for water of the rubber compositions of Examples 1–3 and Comparative Examples 1–4 were measured. Pneumatic tires having a size of 165 SR 13 were produced by the use of each of the rubber compositions in at least the ground contact portion, including to the depth end of the grooves, and the brake performance, traction performance and cornering performance of the tires on the frozen road were tested. The obtained results are shown in Table 1.

Table 1

| | | Example | | | Comparative Example | | | |
|---|---|---|---|---|---|---|---|---|
| | | 1 | 2 | 3 | 1 | 2 | 3 | 4 |
| Compounding recipe (parts by weight) | Polyisoprene rubber | 100 | 50 | 50 | — | 70 | 80 | — |
| | Polystyrene-butadiene rubber | — | — | — | 20 | 70 | — | — |
| | Polybutadiene rubber | — | 50 | 50 | 80 | 30 | — | 30 |
| | ISAF carbon black | 60 | 70 | 70 | 100 | 80 | 60 | 75 |
| | Aroma oil | 40 | 50 | 50 | 60 | 30 | 30 | 40 |
| | Sulfur | 2.0 | 2.0 | 2.0 | 1.5 | 2.0 | 2.0 | 1.5 |
| | Sodium alginate | — | — | 10 | — | — | — | — |
| Properties and performances of rubber position | JIS hardness at −30° C. (degree) | 72 | 63 | 64 | 74 | 78 | 82* | 82* |
| | JIS hardness at 25° C. (degree) | 55 | 54 | 55 | 61 | 66* | 60 | 59 |
| | Tan σ peak temperature (°C.) | −40 | −50 | −50 | −68 | −45 | −37* | −35* |
| | Affinity for water (cm²/cc) | 6.8 | 6.6 | 7.0 | 6.3* | 6.7 | 6.7 | 6.2* |
| | Brake performance | 120 | 125 | 130 | 110 | 115 | 110 | 100 |
| | Traction performance | 120 | 125 | 130 | 110 | 115 | 110 | 100 |
| | Cornering performance | 115 | 120 | 125 | 105 | 110 | 110 | 100 |

Note: Value with the mark * is outside the range defined in the present invention.

In the above Table 1, (1) the brake performance, (2) traction performance and (3) cornering performance of the rubber compositions were measured in the following manner and estimated by the numerical index of the three performances of each rubber composition based on those, calculated as 100, of the rubber composition for general purpose snow tire of Comparative Example 4. A rubber composition having the larger numerical index is the more excellent in the performance. (1) Brake performance: A car was applied with the brake during the car was travelling at speeds of 20, 30 and 40 km/hr, and braking distances of the car were measured. (2) Traction performance: A load cell was arranged between two cars and a power required for starting the two cars were measured. (3) cornering performance: A time required for driving a car along a circular path having a radius of 25 m was measured.

It can be seen from Table 1 that, when at least one of the above described four conditions of the JIS hardnesses at −30° C. and +25° C., tan δ peak temperature and affinity for water of a rubber composition is outside the range defined in the present invention, the rubber composition is poor in all of the brake performance, traction performance and cornering performance, and when a rubber composition, which satisfies all of the above described four conditions at the same time, is used in the tread of a pneumatic tire, the tire can develop fully a faculty as a pneumatic tire for travelling on frozen roads. Further, a rubber composition containing a blend of polyisoprene rubber and polybutadiene rubber is generally lower in the JIS hardness at low temperature and in the tan δ peak temperature and deforms more easily at low temperature than a rubber composition containing polyisoprene rubber. Therefore, a rubber composition containing the rubber blend has a higher frictional coefficient than a rubber composition containing polyisoprene rubber.

What is claimed is:

1. A pneumatic tire for travelling on frozen roads, wherein at least the ground contact portion thereof, including to the depth end of the grooves, is composed of a rubber composition consisting of a rubber component selected from the group consisting of polyisoprene rubber or a blend of polyisoprene rubber and polybutadiene rubber, an agent for improving affinity to water selected from the group consisting of alkali metal alginates, carbon black and a commonly used softener, vulcanizer and other compounding agents, the amount of said agent for improving affinity to water being 3–20 parts by weight based on 100 parts by weight of the rubber component, and said rubber composition having JIS hardnesses of 50–80 degrees at $-30°$ C. and 50–65 degrees at 25° C., a tan $\delta$ peak temperature of not higher than $-40°$ C. and an affinity for water of not lower than 6.5 cm$^2$/cc, wherein if the rubber component is said blend it is a blend consisting of not less than 10 parts by weight of polyisoprene rubber and not more than 90 parts by weight of polybutadiene rubber.

2. The tire according to claim 1, wherein the rubber component is said polyisoprene rubber.

3. The tire according to claim 1, wherein the rubber component is a rubber blend consisting of not less than 50 parts by weight of polyisoprene rubber and not more than 50 parts by weight of polybutadiene rubber.

4. The tire according to claim 1, wherein the rubber composition has a JIS hardnesses of 72 degrees at $-30°$ C. and 55 degrees at 25° C. a tan $\delta$ peak temperature of $-40°$ C. and an affinity for water of 6.8 cm$^2$/cc.

5. The tire according to claim 1, wherein the rubber composition is a blend of 50 parts by weight of polyisoprene rubber and 50 parts by weight of polybutadiene rubber as said rubber component and has JIS hardnesses of 63 degrees at $-30°$ C. and 54 degrees at 25° C., a tan $\delta$ peak temperature of $-50°$ C. and an affinity for water of 6.6 cm$^2$/cc.

6. The tire according to claim 1, wherein the rubber composition is a blend of 50 parts by weight of polyisoprene rubber and 50 parts by weight of polybutadiene rubber as said rubber component and 10 parts by weight of sodium alginate, and has JIS hardnesses of 64 degrees at $-30°$ C. and 55 degrees at 25° C., a tan $\delta$ peak temperature of $-50°$ C. and an affinity for water of 7.0 cm$^2$/cc.

7. A pneumatic tire for travelling on frozen roads, comprising a tread including a cap having a thickness from the ground contact surface to the depth of the grooves and a width extending over all the ground contact area of the tread, said cap consisting of a rubber composition according to claim 1.

8. The tire according to claim 1, wherein said alkali metal alginate is sodium alginate.

9. The tire of claim 10, wherein said alkali metal alginate is sodium alginate.

* * * * *